(12) United States Patent
Demadis et al.

(10) Patent No.: US 6,461,518 B1
(45) Date of Patent: *Oct. 8, 2002

(54) METHOD FOR INHIBITING THE FORMATION AND DEPOSITION OF SILICA SCALE IN WATER SYSTEMS

(75) Inventors: Konstantinos Demadis, Glen Ellyn; Douglas G. Kelley, Naperville; David P. Workman, Naperville; Mingli Wei, Naperville, all of IL (US)

(73) Assignee: Nalco Chemical Company, Naperville, IL (US)

( * ) Notice: Subject to any disclaimer, the term of this patent is extended or adjusted under 35 U.S.C. 154(b) by 15 days.

This patent is subject to a terminal disclaimer.

(21) Appl. No.: 09/699,672

(22) Filed: Oct. 30, 2000

Related U.S. Application Data

(63) Continuation-in-part of application No. 09/261,821, filed on Mar. 3, 1999, now Pat. No. 6,153,106.
(51) Int. Cl.[7] .................................................. C02F 5/12
(52) U.S. Cl. ........................ 210/698; 252/180; 252/392; 422/16
(58) Field of Search ................................ 210/698–701, 210/702, 732, 749, 750, 764; 252/180, 181, 390, 392; 422/16, 17

(56) References Cited

U.S. PATENT DOCUMENTS

| | | | |
|---|---|---|---|
| 2,926,116 A | 2/1960 | Keim | 162/164 |
| 2,926,154 A | 2/1960 | Keim | 260/29.2 |
| 3,607,622 A | 9/1971 | Espy | 162/167 |
| 3,779,793 A | 12/1973 | Hughes et al. | 117/72 |
| 3,793,194 A | 2/1974 | Zecher | 210/698 |
| 4,469,615 A | 9/1984 | Tsuruoka et al. | 252/180 |
| 4,532,047 A | 7/1985 | Dubin | 210/698 |
| 5,247,087 A | 9/1993 | Rivers | 544/357 |
| 5,344,674 A | 9/1994 | Wu | 427/386 |
| 5,527,863 A | 6/1996 | Wood et al. | 525/432 |
| 5,658,464 A | 8/1997 | Hann et al. | 210/697 |
| 5,658,465 A | 8/1997 | Nicholas et al. | 210/698 |
| 6,005,040 A | 12/1999 | Howland et al. | 524/406 |
| 6,153,106 A | * 11/2000 | Kelley et al. | 210/698 |

OTHER PUBLICATIONS

Dubin et al., *Deposit Control in High Silica Water*, Materials Performance. pp. 27–33 (1985).

Gill, *Silica Scale Control*, Corrosion 98, Paper No. 226 (1998).

* cited by examiner

*Primary Examiner*—Peter A. Hruskoci
(74) *Attorney, Agent, or Firm*—Michael B. Martin; Thomas M. Breininger

(57) ABSTRACT

This invention relates to a method for inhibiting the formation and deposition of silica scale in water systems. The method includes treating the water in such water systems with an effective amount of a polyamide that contains secondary amine and/or ether and amide functional groups.

15 Claims, No Drawings

METHOD FOR INHIBITING THE FORMATION AND DEPOSITION OF SILICA SCALE IN WATER SYSTEMS

CROSS REFERENCE TO RELATED APPLICATIONS

This is a continuation-in-part of U.S. Ser. No. 09/261,821, filed Mar. 3, 1999, now U.S. Pat. No. 6,153,106.

BACKGROUND OF THE INVENTION

This invention generally relates to silica scale inhibitors. More specifically, this invention relates to a method for inhibiting the formation and deposition of silica and silicate compounds in water systems with water-soluble polyamides.

In many parts of the world, amorphous silica scales cause significant fouling problems when industrial waters contain high quantities of silica. For the most part, high quantities of silica means that the industrial waters contain at least 5 ppm and up to about 500 ppm dissolved silica and may contain higher quantities of silica either in dissolved, dispersed or colloidal forms.

The solubility of silica adversely limits the efficient use of water in industrial applications, such as cooling, boiler, geothermal, reverse osmosis and papermaking. Specifically, water treatment operations are limited because the solubility of silica at about 150 ppm can be exceeded when minerals are concentrated during processing. This can result in the precipitation and deposition of amorphous silica and silicates with consequential loss of equipment efficiency. Moreover, the accumulation of silica on internal surfaces of water treatment equipment, such as boilers, cooling, and purification systems, reduces heat transfer and fluid flow through heat exchange tubes and membranes.

Once the silica scale forms on water treatment equipment, the removal of such scale is very difficult and costly. With high silica water, therefore, cooling and reverse osmosis systems typically operate at low water-use efficiency to assure that the solubility of silica is not exceeded. Under these conditions, however, reverse osmosis systems must limit their pure water recovery rate and cooling systems must limit water recycling. In both cases, water discharge volumes are large.

Various additives have been employed over the years to inhibit silica deposition. The current technologies for silica scale control in industrial cooling systems involve the use of either colloidal silica dispersants or silica polymerization inhibitors. Dispersant technologies have shown little activity, being able to stabilize only slight increases of total silica in a tower. For instance, by feeding a dispersant, silica levels may increase from 150–200 to 180–220 ppm, which is often an undetectable increase in silica cycles.

On the other hand, silica polymerization inhibitors have shown to be more effective against silica scale deposition. For example, U.S. Pat. No. 4,532,047 to Dubin relates to the use of a water-soluble low molecular weight polypolar organic compound for inhibiting amorphous silica scale formation on surfaces in contact with industrial waters. Likewise, U.S. Pat. No. 5,658,465 to Nicholas et al relates to the use of polyoxazoline as a silica scale inhibition technology. These polymerization inhibitors have allowed for increases in soluble silica to greater than 300 ppm without scale formation.

SUMMARY OF THE INVENTION

This invention provides an improved method for inhibiting the formation and deposition of silica and silicate compounds in water systems. The inventors have surprisingly discovered that certain polymers containing secondary amine and/or ether and amide functional groups are effective inhibitors of soluble silica polymerization and scale development in water systems. The inventors believe that the use of a polymer with such secondary functional groups prevents potential steric hindrance that occurs in prior polymeric formulations.

Accordingly, in its principal aspect, this invention is directed to a method for inhibiting the formation and deposition of silica and silicate compounds in water systems comprising adding to the water in the water system an effective amount of a water-soluble condensation polymer obtained by the polymerization of:

i) at least one carbonyl compound of formula

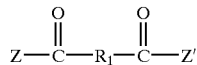

wherein $R_1$ is selected from linear, cyclic or branched $C_1$–$C_8$ alkylene groups, aromatic groups, polycyclic groups and heterocyclic groups; Z and Z' are independently selected from halogen, —OH, —OR$_2$, and OC(O) R$_2$; and R$_2$ is selected from linear, cyclic or branched $C_1$–$C_8$ alkyl groups, aromatic groups, polycyclic groups or heterocyclic groups, with ii) at least one polyamine having at least two amine groups.

An advantage of this invention is it provides a liquid polymeric scale inhibitor that is much easier to handle and feed than the borate-based silica scale inhibitors.

Another advantage of this invention is that it provides a condensation polymer that is less expensive to manufacture than the polyoxazoline proposed in U.S. Pat. No. 5,658,465, resulting in increased cost performance. Moreover, the polymer of this invention is more cost-effective; it has been shown to outperform prior polymeric compositions on an equal polymer actives weight basis.

Moreover, an advantage of the invention is that it minimizes potential steric problems associated with prior polyamide silica inhibitors by utilizing secondary amine and/or ether and amide functionality. Specifically, the polyaminoamides and polyetherarnides of this invention incorporate both the amine (or ether) and amide functionalities into the backbone of the polymer. Therefore, the ability of these functional groups to interact in solution with silica and silicate species is enhanced. On the other hand, U.S. Pat. No. 5,658,465 teaches the use of polyamides created by polymerizing oxazoline monomers. These polyamides contain only amide functional groups, rather than a combination of amide, amine and/or ether functional groups. In addition, the polyoxazolines taught by Nicholas et al have the amide functional groups pendent to the polymer backbone, which the inventors believe causes the activity of these polymers to suffer due to the pendent amide being trapped between the terminal amide R-group and the polymer backbone, which sterically hinders interactions with the silica and silicate species.

Still further, another unique aspect of the polyamide technology of this invention is that it incorporates the activity of the amine and/or ether functional groups as well as that of the amide. In this way, there are more functional sites on the polymer for enhancing the interactions with silica and silicate species in solution as compared to previous polyoxazoline technologies.

The condensation polymers of this invention may be used alone or in combination with other water treating agents. For example, the polymers may be used in combination with phosphoric acids and their salts, phosphonic acids and their salts, metal chelating agents, corrosion inhibitors, polymer scale control dispersants, microbiocides, flocculants, coagulants, oxygen scavengers, neutralizing amines, scale inhibitors, homo- and copolymers of acrylic acid, and homo- and copolymers of maleic acid or anhydride and acrylic acid/maleic acid based polymers.

Additional features and advantages of this invention are described in, and will be apparent from, the detailed description of the presently preferred embodiments.

DETAILED DESCRIPTION OF PRESENTLY PREFERRED EMBODIMENTS

This invention specifically relates to the use of a polyamide composition for inhibiting the formation and deposition of silica and silicate compounds in water systems. The water-soluble polyamides of this invention are formed from condensation polymerization of at least one or more carboxylic acids, esters, acid halides or anhydrides with one or more polyamines.

As used herein, "polyamine" means a compound of formula $H_2N-L-NH_2$ where L is any combination of linear, cyclic or branched $C_2-C_8$ alkylene groups, aromatic groups, polycyclic groups and heteroclic groups, where at least one of the alkylene, aromatic, polycyclic and heteroclic groups are connected through NH or O.

The polyamide of this invention consists of repeating groups of formula

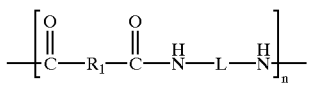

where $R_1$ and L are defined herein and n is an integer such that the molecular weight of the polyamide is at least 500.

In another preferred embodiment, the polyamides are prepared by condensing one or more carboxylic acids, acid halides, esters or anhydrides with one or more polyamines and an epoxy resin.

In another preferred embodiment, the condensation polymer is prepared by condensing one or more carboxylic acids, acid halides, esters or anhydrides with one or more polyamines and the reaction product of an epoxy resin with one or more polyamines.

The epoxy resin compounds suitable for use in preparing the polymeric condensation products of this invention are organic compounds having at least two reactive epoxy groups. These compounds can contain substituent groups such as alkyl, aryl, organic ester, phosphate ester, halogen, cyano group among others without interfering with the condensation. The epoxy resin compounds may also have olefinic unsaturation on substituents. The preferred epoxy resin compounds are the aryl or alkyl substituted compounds having as the sole reactive group under the conditions of the reaction, at least two epoxy groups and wherein oxygen is present only in oxirane, ether and ester arrangement. Particularly preferred are the compounds consisting only of carbon, hydrogen and oxygen, wherein oxygen is present only in oxirane, ether and ester arrangement and the epoxy groups are terminal groups of an aryl substituted compound.

It is to be understood that the invention is not limited to the foregoing compounds alone and a variety of epoxy resin compounds can be used. Moreover, a mixture of two or more epoxy resins can be used for the practice of this invention. Or, if desired, the polyamine can be reacted successively with different epoxy resins to obtain the condensation polymers.

The epoxy resin may be any compound containing two or more epoxide groups. Representative epoxy resins include, but are not limited to 2,2-bis(4-hydroxyphenyl) propane diglycidyl ether; 2,2'-[(1-methylethylidene)bis(4,1-phenyleneoxymethylene)]bisoxirane hompolymer; resorcinol diglycidyl ether; hydroquinone diglycidyl ether; triglycidyl tris(2-hydroxyethyl) isocyanurate; glycerol polyglycidyl ether; trimethylolpropane polyglycidyl ether; diglycerol polyglycidyl ether; polyglycerol polyglycidyl ether; sorbitol polyglycidyl ether and pentaerythritol polyglycidyl ether.

In another preferred embodiment, the condensation polymer of this invention may be further cross-linked with suitable cross-linking agents. The post-polymerization cross-linking agent may be any compound containing two or more reactive functional groups. Preferred cross-linking agents include epoxy resins as defined herein.

In another preferred embodiment, the carbonyl compound has formula

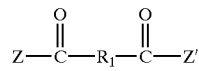

where $R_1$ is selected from linear, cyclic or branched $C_4-C_8$ alkylene groups and aromatic groups; Z and Z' are independently selected from halogen, $-OH$, $-OR_2$, and $OC(O)R_2$; and $R_2$ is selected from linear, cyclic or branched $C_1-C_8$ alkyl groups, aryl groups, heterocyclyl groups and heteroaryl groups.

As used herein, carboxylic acid, acid halide, ester and anhydride encompasses multifunctional compounds which are carboxylic acids, esters or anhydrides also containing other functional groups or more than two acid, ester or anhydride groups).

Polyamines and carboxylic acids having heterocyclic groups include aziridines, azetidines, azolidines, tetra- and dihydropyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'diaminoalkylpiperazines, azepines, azocines, azonines, azecines and tetra-, di- and perhydro derivatives of each of the above and mixtures of two or more of these heterocyclic amines.

The aromatic group can be a single carbocyclic or heterocyclic aromatic nucleus, such as a benzene nucleus, a pyridine nucleus, a thiophene nucleus, a 1,2,3,4-tetrahydronaphthalene nucleus, or a polynuclear aromatic moiety. Such polynuclear moieties can be of the fused type, that is wherein at least two aromatic nuclei are fused at two points to another nucleus such as found in naphthalene, anthracene, and the azanaphthalenes among others. Such polynuclear aromatic moieties can be of the linked type wherein at least two nuclei (either mono or polynuclear) are linked through bridging linkages to each other. Such bridging linkages can be selected from the group consisting L of carbon-to-carbon single bonds, ether linkages, keto linkages, sulfide linkages, polysulfide linkages of 2 to 6 sulfur atoms, sulfinyl linkages, sulfonyl linkages, methylene linkages, alkylene linkages, di- (lower alkyl)-methylene linkages, lower alkylene ether linkages, alkylene keto linkages, lower alkylene sulfur linkages, lower alkylene polysulfide linkages of 2 to 6 carbon atoms, amino linkages, polyamino linkages and mixtures of such divalent bridging linkages.

In another preferred embodiment, the carbonyl compound is selected from the group consisting of: adipic acid; sebacic acid; terephthalic acid and combinations thereof.

In another preferred embodiment, the polyamines are selected from the group consisting of polyamines of formula $H_2NR_3NH_2$, $H_2N{-}R_3{-}NH{-}R_4{-}NH_2$,

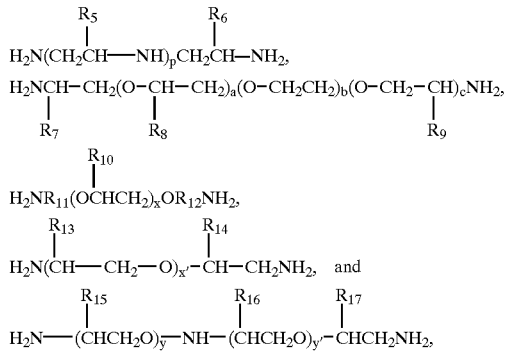

wherein
$R_3$ and $R_4$ are independently selected from linear, cyclic or branched $C_2$–$C_8$ alkylene groups, aromatic groups, polycyclic groups and heterocyclic groups; $R_5$ and $R_6$ are independently selected from hydrogen and methyl; $R_7$, $R_8$, $R_9$, $R_{10}$, $R_{13}$ $R_{14}$, $R_{15}$, $R_{16}$ and $R_{17}$ are independently selected at each occurrence from hydrogen and $C_1$–$C_4$ alkyl; $R_{11}$ and $R_{12}$ are $C_1$–$C_4$ alkylene; x is an integer of from 1 to about 10; x' is an integer of from about 2 to about 5; y and y' are independently integers of from about 2 to about 58; p is an integer of from 0 to about 8; the sum of a+c is from about 2 to about 8; and b is an integer of from about 2 to about 50, provided that the polyamine of formula $H_2NR_3NH_2$, is always used in a mixture that contains at least one additional polyamine other than $H_2NR_3NH_2$.

In another preferred embodiment, the polyamine is diethylenetriamine or 4,7,10-trioxa-1,13-tridecane diamine.

In another preferred embodiment, the polyamine has formula $H_2N{-}R_3{-}NH{-}R_4{-}NH_2$, Wherein $R_3$ and $R_4$ are independently selected from linear, cyclic or branched $C_2$–$C_8$ alkylene groups, aromatic groups, polycyclic groups and heterocyclic groups.

In another embodiment, the polyamine is obtained from condensation reactions of ethylene and propylene amine, or mixtures thereof. Specifically, the polyamine has formula $H_2N(CH_2CH{-}R_5{-}NH)_pCH_2CHNH_2{-}R_6$, where $R_5$ and $R_6$ are independently selected from hydrogen and methyl and p is an integer of from 0 to about 8, preferably from 0 to about 4, and more preferably from 1 to about 2.

In another preferred embodiment, the polyamine has formula $H_2NR_{11}(OCHCH_2)_xOR_{12}NH_2$, where $R_{10}$ is selected from hydrogen and $C_1$–$C_4$ alkyl; $R_{11}$ and $R_{12}$ are $C_1$–$C_4$ alkylene; and x is an integer of from 1 to about 10.

In another preferred embodiment, the polyamine is a relatively low molecular weight poly(alkylene glycol) diamine of formula $H_2N(CHCH_2O)_{x'}{-}CHCH_2NH_2$, with $R_{13}$ and $R_{14}$ substituents where $R_{13}$ and $R_{14}$ are independently selected from hydrogen and $C_1$–$C_4$ alkyl; and x' is an integer of from about 2 to about 5. The polyethylene glycol diamine has a molecular weight of at least 100 and is a mixture of ethylene oxide and propylene oxide. Preferably, $R_{13}$ and $R_{14}$ are hydrogen and x' is from about 2 to about 3. When $R_{13}$ and $R_{14}$ are hydrogen and x' is 2, the polyethylene glycol diamine is triethylene glycol diamine (JEFFAMINE® EDR-148 amine). When $R_{13}$ and $R_{14}$ are hydrogen and x' is 3, the polyethylene glycol diamine is tetraethylene glycol diamine (JEFFAMINE® EDR-198 AMINE). It will be appreciated that throughout this description x' is understood to be an average value of the distribution of polymers present, rather than an absolute number indicating a completely pure material.

In another preferred embodiment, the polyamine is a polyoxyalkylene diamine of formula $H_2NCH{-}CH_2(O{-}CH{-}CH_2)_a(O{-}CH_2CH_2)_b(O{-}CH_2{-}CH)_cNH_2$, with $R_7$, $R_8$, $R_9$ where $R_7$, $R_8$ and $R_9$ are independently selected from hydrogen and $C_1$–$C_4$ alkyl; the sum of a+c is from about 2 to about 8; and b is an integer of from about 2 to about 50. A representative polyoxyalkylene diamine is 4,7,10-trioxa-1,13-tridecane diamine. Again, a, b and c are to be understood as average values in many instances. Preferably, the ethylene oxide moieties denoted by b represent at least 50% of the molecule. Stated in another way, this could be represented as:

$$\frac{b}{a+b+c} \geq 0.5$$

The JEFFAMINE ED series diamines fall within this definition:

|  | a + c = | b = |
|---|---|---|
| JEFFAMINE ® ED-600 | 3.5 | 13.5 |
| JEFFAMINE ® ED-900 | 3.5 | 20.5 |
| JEFFAMINE ® ED-2001 | 3.5 | 45.5 |

These Jeffamines are available from Huntsman Chemical, Salt Lake City, Utah. As used herein, the term JEFFAMINE® D-190 describes polyoxypropylene diamine of formula

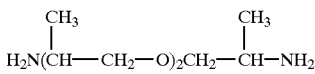

As used herein, the term JEFFAMINE® D-230 describes polyoxypropylene diamine of formula

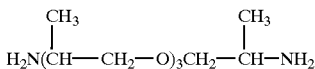

As used herein, the term JEFFAMINE®T D-400 describes Polyoxypropylene diamine of formula

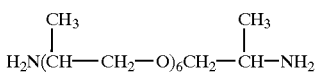

More than one polyoxyalkylene diamine within this definition may be used as desired to affect the properties of the final polyamide. Preferably, $R_7$, $R_8$ and $R_9$ are methyl and the sum of a+c is from about 3 to about 4. Alternatively, a and c are independently 1 or 2 and some, but not all, of the ethoxy moiety subscripted by b could be propoxy.

In another preferred embodiment, the polyamine has formula

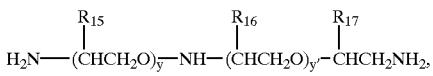

$R_{13}$, $R_{14}$, $R_{15}$, $R_{16}$ and $R_{17}$ are independently selected at each occurrence from hydrogen and $C_1$–$C_4$ alkyl; x' is an integer of from about 2 to about 5; and y and y' are independently integers of from about 2 to about 58.

In another preferred embodiment, the polyamine is a mixture of diamines of formula

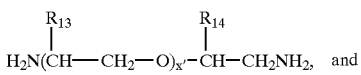

triamines of formula

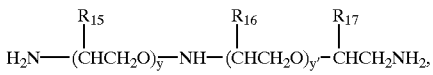

$R_{13}$, $R_{14}$, $R_{15}$, $R_{16}$ and $R_{17}$ are independently selected at each occurrence from hydrogen and $C_1$–$C_4$ alkyl; x' is an integer of from about 2 to about 5; and y and y' are independently integers of from about 2 to about 58.

Many modifications may be made in the process of this invention without departing from the spirit and scope thereof which are defined only in the appended claims. For example, one skilled in the art may discover that particular reaction conditions, sequences, polyamines and dicarboxylic acids which may not be explicitly recited herein, but which are nevertheless anticipated, would give optimal or otherwise desirable results.

Since the reaction product can contain mixtures both in terms of different acids and/or different amines, and also with different molecular weights, both with the same or different difunctional acids and/or polyamine, mixtures of condensation polymers can also be used pursuant to this invention.

The reaction conditions and variants to obtain the condensation polymers are described below, and also have been described in the following references: U.S. Pat. Nos. 2,926,116; 2,926,154; and 3,607,622. Each of these references is incorporated herein by reference.

It has been found particularly preferable to use in the reaction mixture wherein for said acid, ester or anhydride the ester, acid or anhydride functionality is in a molar ratio of approximately 1:1 with the amine functionality of the amine utilized.

This invention provides methods for inhibiting the formation and deposition of silica and silicate compounds in water systems. The methods include adding to the water in a water system an effective amount of a polyamide made pursuant to this invention. The precise effective dosages at which the polyamides of the invention can be employed will vary depending upon the makeup of the water being treated. An effective dosage will usually be in the range of about 0.5 to about 500 ppm, with the dosage in the range of about 1 to about 100 ppm being preferred. Most preferably, the polyamide is added to the water in an amount ranging from about 5 to about 60 ppm. These dosages are typical for water treatment additives.

The industrial waters that require treatment with the condensation polymers of this invention are generally waters that contain silica in a dissolved, suspended or colloidal form. Such industrial waters are typified by those waters found in the Gulf of Mexico states, such as on the industrial gulf coast of Louisiana and Texas. The silica is present as dissolved silicates or their complex ions and may also be present as colloidal silica or suspended silica. The total silica concentration in these industrial waters is normally low when it exceeds about 5 ppm in total concentration; amorphous silica scale formation then becomes a problem. Obviously, the higher the concentration of total silica from all sources in these waters, the more difficult is the problem created by amorphous silica scale formation.

The industrial waters may be cooling waters, geothermal waters, salt water for desalinization purposes, industrial waters being prepared for boiler treatment and steam generation, downhole waters for petroleum crude recovery, pulp and paper mill waters, mining and mineral processing waters and the like. The problem of amorphous silica scale formation on the surfaces in contact with these industrial waters is particularly noted when the industrial waters are alkaline, having a pH of at least 5.0 or above, and contain at least 5 ppm total silica as $SiO_2$. The effective use of the condensation polymers of this invention are preferably at pH's of at least 5.0 and above and may be at temperatures ranging between ambient temperatures to temperatures in excess of 300° F. However, as one of skill in the art would appreciate, the condensation polymers of this invention should also be effective in waters having a pH lower than 5.0.

Of particular importance is the treatment of alkaline industrial waters being used as cooling waters, either on a once-through basis or particularly in a recirculating cooling water system wherein the make-up waters concentrate by up to a factor of 10 or so. When these alkaline cooling waters contain sufficient total silica, the problem of amorphous silica scale formation on surfaces in contact with these cooling waters is exaggerated. As the alkalinity increases, the problem of amorphous silica scale formation also increases. Therefore, the effectiveness of the condensation polymers used in this invention must also be demonstrated at pH's in excess of about 8.0.

Finally, the condensation polymers of this invention may be combined with other standard water treating agents. For example, the condensation polymers may be used with other cooling water treatments, such as those used to inhibit corrosion and those treatments used to disperse or prohibit scale formation of other types. These type treatments may contain standard ingredients such as chromium, zinc, phosphate, orthophosphate, polyphosphate, low molecular weight polymeric dispersants such as homo or co-polymers of acrylic acid acrylamide, and various acrylates which are primarily used as threshold agents in these cooling water applications. These threshold agents combine with hardness precipitating species to inhibit crystal groups and better disperse these kinds of materials, thereby inhibiting scale formation of these hardness materials. However, these threshold polymeric agents do not have an effective use for silica control and are ineffective when used for amorphous silica scale control. Therefore, the condensation polymer of this invention may be combined with these polymeric dispersants to effectively control scale formation of all kinds, including amorphous silica scale formation.

According to an embodiment of the invention, the condensation polymers of the invention are prepared as follows. A poly(aminoamide) condensation polymer may be prepared from about 0.5/1.0 to 1.0/0.5 molar ratio of polyamine/diacid (dicarboxylate). In another embodiment, the polyamine consists of a mixture of a polyamine and the reaction product of an epoxy resin and either the same or a different polyamine. Prior to use, the polymer may be first diluted to about 5 to 60% polymer in solution and/or acidified to a pH ranging from about 5.0–10.0 as is conventional in the art. The preferred polyamine and diacid (dicarboxylate) of the invention are diethylenetriamine and adipic acid (or its esters), respectively. Additional preferred polyamines and diacids are disclosed herein. Sulfuric acid is typically used to adjust the pH of the backbone solution, but the identity of the acid is not critical to the invention. Acetic acid, phosphoric acid, and hydrochloric acid can also be used. The use of hydrochloric acid would, however, be less desirable since it would introduce chloride ions into the product.

The only upper limitation on the molecular weight of the copolymers is that they are of any molecular weight which allows water-solubility.

The following examples are presented for purposes of illustration and are not meant to limit the scope of the invention.

EXAMPLE 1

The polyamides of this invention were made by condensation polymerization in the following manner.

Diethylenetriamine (191.6 g) was weighed into a flask. The flask was equipped L with resin head, stirrer, thermometer, thermocouple, distillation trap, and condenser. The amine was stirred and cooled. Then, deionized water (about 66.3 g) and adipic acid (292 g) was added to the flask while the reaction temperature was maintained at less than 90° C. Immediately after adding all of the adipic acid, external cooling was ceased and the reaction mixture was heated to about 185° C. When the reaction temperature reached about 123° C., water began to distill, and was removed continuously through the trap and collected in a graduated cylinder. The reaction mixture was heated under nitrogen at about 185° C. for three hours and then was air-cooled to about 140–150° C. Deionized water (417.2 g) was added carefully and the reaction mixture was heated to reflux and reflux was maintained for 60 minutes. The reaction mixture was then cooled to room temperature.

Condensation polymers 2–5 of Table 1 were prepared according to this technique, and have the physical characteristics as described below.

TABLE 1

| Polymer | Amine | Acids | Ratio Amine/Acid | $M_w$ | $M_n$ |
|---|---|---|---|---|---|
| 2 | A | C | 0.95/1.0 | 23600 | 6100 |
| 3 | A | D/C | 0.95/.33/.67 | 4400 | 2700 |
| 4 | A | E/C | 0.95/.33/.67 | 3000 | 2000 |
| 5 | A | D/C | 0.98/.33/.67 | 15200 | 5000 |

A = Diethylenetriamine, available from Aldrich Chemical Co. of Milwaukee, Wisconsin.
C = $HO_2C(CH_2)_4CO_2H$ (adipic acid), available from Aldrich Chemical Co. of Milwaukee, Wisconsin.
D = $HO_2C(CH_2)_8CH_2H$ (sebacic Acid), available form Aldrich Chemical Co. of Milwaukee, Wisconsin.
E = Terephthalic acid, available from Aldrich Chemical Co. of Milwaukee, Wisconsin.

EXAMPLE 2

The following procedure was utilized to form a condensation terpolymer, where one of the polyamines to be condensed is first pre-reacted with a polyepoxide. In this instance, a terpolymer of adipic acid, diethylenetriamine and diethylenetriamine/EPON 828 reaction product was formed.

EPON 828 (17.52 g), a Bisphenol A epoxy resin available from Shell Chemical, Houston, Tex., was mixed with 75.52 g of diethylenetriamine under a nitrogen blanket at 130° C. for two hours. After cooling to about 50°, 106.96 g of adipic acid and 100 g of deionized water were added to the reactor. The mixture was heated to about 185° C. while distilling off water. After 3 hours at 185° C., the solution was cooled to about 150° C. and 180 g of deionized water was added carefully. The solution was heated at boiling for 1 hour and cooled to room temperature. The BFV (Brookfield Viscosity) of the resulting product was 1700 cps (spindle 1, 1.5 rpm).

EXAMPLE 3

The following procedure was utilized to form a condensation terpolymer, where one of the polyamines to be condensed is first pre-reacted with a polyepoxide. In this instance, a terpolymer of adipic acid, diethylenetriamine and diethylenetriamine/EPON 828 reaction product was formed.

EPON 828 (3.8 g) and 78.5 g of diethylenetriamine were heated under a nitrogen blanket at 130° C. for 2 hours. After cooling to about 50° C., 117.7 g of adipic acid and 100 g of deionized water were added. The mixture was heated to 185° C. while distilling off water. After 3 hours at 185° C., the solution was cooled to about 150° C., and 180 g of deionized water was added carefully. The solution was heated at boiling for 1 hour and cooled to room temperature. The BFV of the resulting product was 648 cps (spindle 1, 1.5 rpm).

EXAMPLE 4

Cross linked polyamides in accordance with this invention were prepared in the following manner.

Poly(adipic acid/diethylenetriamine/Bisphenol A epoxy resin-diethylenetriamine adduct, 553.5 g, 40.7%), prepared according to procedure of Example 3 was weighed directly into a flask. Polyepoxide, sorbitol polyglycidyl ether (1.33 g, available from Nagase America Corp., New York, N.Y.) was also weighed directly into the reaction flask. Dosage was 0.6% based on polymer actives. The flask was equipped with resin head, stirrer, thermometer and thermocouple. The reaction mixture was heated to 60° C. with stirring for 1.0 hour then cooled to room temperature. The BFV of the resulting product was 5150 cps (spindle 3, 6 rpm), where the BFV of the starting polymer was only 1200 cps (spindle 3, 6 rpm). This increase indicates that cross-linking has occurred.

EXAMPLE 5

An amine-rich condensation polymer of diethylenetriamine and adipic acid was prepared as follows.

Diethylenetriamine (130.4 g) was weighed directly into a flask. The flask was equipped with a stirrer, a thermocouple, a distillation trap and a condenser. Deionized water (50 grams) was added to the reactor, followed 161.3 g of adipic acid. The reaction mixture was heated to 185° C. with distillation of water starting at about 120° C. Heating at 185° C. was continued for 3 hours. A nitrogen blanket was applied throughout the heating cycle. After 3 hours, the solution was air cooled to 140–150° C. and 360 grams of deionized water was then added slowly. The solution was reheated to 90° C. for one hour and then cooled to room temperature.

Condensation polymers 6 and 7 of Table 2 were prepared according method outline in Example 5 using diethylenetriamine and adipic acid. Physical characteristics are described below.

TABLE 2

| Polymer | Ratio Amine/Acid | $M_w$ | $M_n$ |
| --- | --- | --- | --- |
| 6 | 1.0/0.80 | 4,100 | 2,560 |
| 7 | 1.0/0.95 | 10,800 | 4,300 |

EXAMPLE 6

A representative condensation polymer of this invention where the polyamine is a mixture of a diamine and a triamine was prepared as follows.

Into a reaction flask was weighed 41.3 g of diethylenetriamine and 44.4 grams of 1,3-diaminopropane. The flask was equipped with a stirrer, a thermocouple, a distillation trap and a condenser. Deionized water (50 g) was added to the reactor, followed by the addition of 131.4 g of adipic acid. The reaction mixture was initially heated to 130° C. After 30 minutes the reaction temperature was increased to 185° C. Distallation of water started at about 140° C. The reaction mixture was heated at 185° C. for 3 hours. A nitrogen blanket was applied throughout the heating cycle. After 3 hours, the solution was air cooled to 140–150° C. and 277 g of deinized water was added carefully. The solution was reheated to 90° C. for one hour and then cooled to room temperature.

EXAMPLE 7

A condensation polymer of adipic acid and 4,7,10-trioxa-1,13-tridecane diamine (PE-PAMAM) was prepared as follows.

Into a 5-neck 2-piece glass reactor equipped with a mechanical stirrer, thermal coupler, nitrogen line and a water condenser and Dean-Stark trap was weighed 66.0 g (0.3 mol) of 4,7,10-trioxa-1,13-tridecane diamine. The diamine was cooled using an ice-water bath. To the cooled diamine was slowly added 30 g of deionized water and 43.8 g (0.3 mol) of adipic acid. The mechanical stirrer motor speed was set to 300 rpm. The reactor was purged with nitrogen for 10 minutes, then the reaction mixture was heated to 185° C. Water started coming out at about 120° C. The distilled water was collected in the Dean-Stark trap during the heating process. The reaction mixture was heated for 3 hours at 185° C, then the heating was stopped. When the viscous polymer solution had cooled down to 120° C., 250 g of deionized water was slowly added. The solution was stirred at 60° C. until it became homogeneous. The polymer was cooled down and collected as a light yellow viscous solution.

EXAMPLE 8

A condensation polymer of adipic acid and ED-600 (EO/PO-PAMAM) was prepared as follows.

Into a 5-neck 2-piece glass reactor equipped with a mechanical stirrer, thermal coupler, nitrogen line and a water condenser and Dean-Stark trap was weighed 60.0 g (0.1 mol) of ED-600 (poly(propylene glycol)-block-poly (ethylene glycol)-block-poly(propylene glycol)-bis(2-aminopropyl ether): $H_2N$—$(PO)_a$—$(EO)_b$—$(PO)_c$—$NH_2$, a+c=3.6, b=9, available from Huntsman Chemical, Salt Lake City, Utah) was weighed into a 5-neck 2-piece glass reactor. Adipic acid (14.6 g, 0.1 mol) was then slowly added and the mechanical stirrer motor speed was set to 300 rpm. The reactor was purged with nitrogen for 10 minutes, then the reaction mixture was heated to 185° C. Water started coming out at about 120° C. The distilled water was collected in the Dean-Stark trap during the heating process. The reaction mixture was heated for 3 hours at 185° C., then the heating was stopped. When the viscous polymer solution cooled down to 120° C., 130 g of deionized water was slowly added. The solution was stirred at 60° C. until it became homogeneous. The polymer was cooled down and collected as a light yellow viscous solution.

EXAMPLE 9

A silica stabilization test was used to determine the ability of a treatment chemical to inhibit the polymerization of silica from the soluble form to the colloidal form. In this test, the pH of a solution of soluble silicate ions was lowered from about pH 11 to about pH 7. In the pH range of 7–9, which is the dominant range for industrial processes like cooling water and desalination, the polymerization of silicate ions and subsequent particle growth into colloidal silica is thermodynamically preferred.

The test described below is for the example in which no treatment chemical was added:

1. Dissolve 0.236 g of $Na_2SiO_3 \cdot 9H_2O$ in 100 mL of silica-free water in a plastic beaker. This gives a solution containing 500 ppm as $SiO_2$.
2. Stir and sparge gaseous $CO_2$ into the solution.
3. Remove the $CO_2$ sparger when the pH has dropped to 8.5. Because the $CO_2$ is still dissolving over time into the solution, the pH will continue to decrease without the sparger present (the lowest pH value obtained is usually 7.0).
4. Allow the samples to stand for 24 hours, then analyze the soluble $SiO_2$ (using the HACH Silicomolybdate method).

To test the performance of different treatment chemicals, the desired additive was dissolved into the sodium silicate solution just prior to step 2. Specifically, 0.4 mL of a 1.0% solution of the additive was added to the sodium silicate solution. This resulted in a 500 ppm $SiO_2$ solution containing 40 ppm actives of the desired treatment chemical.

The silica analytical test method used in the experiments is the High Range (0–100 ppm) Silicomolybdate Method from Hach Company. In this test method, a 2.5 mL sample of the test solution is diluted to 25 mL in a sample cell. The contents of Molybdate Reagent Powder Pillow are then added to the sample cell solution, followed by the contents of the Acid Reagent Powder Pillow. The solution is mixed well and allowed to stand for 10 minutes. At that time, the contents of the Citric Acid Powder Pillow is added to the sample cell with mixing, and the solution is allowed to stand for two minutes. At the end of this time, the absorbance of the sample cell solution was measured at 450 nm. An increase in soluble silica is based on the increase in absorption at 450 nm.

Table 3 shows silica stabilization test results from the study of various low molecular weight polymers (MW<100,000 g/mol) and other additives. Specifically, the following inhibitors were screened in this experiment: A=blank control (no treatment chemical); B=Acumer 5000, which is a poly (acrylic acid/t-butyl acrylamide/2-acrylamido-2-methyl propane sulfonic acid), available from Rohm & Haas of North Olmstead, Ohio; C=poly(2-ethyl-oxazoline) ("PEOX"), available from BF Goodrich of Richfield, Ohio, D=poly (adipic acid/diethylenetriamine) ("PADETA"), which is a polyamide made pursuant to this invention. The PADETA tested herein has the following structure: —(—C(=O)CH$_2$CH$_2$CH$_2$CH$_2$C(=O)—)$_x$(—NH—CH$_2$CH$_2$—NH—CH$_2$CH$_2$—NH)$_y$, E=2-phosphonobutane-1,2,4-tricarboxylic acid (Bayer Corporation, Myerstown, Pa.), F=amino-tri (methylene phosphonic acid) (Solutia, Inc., St Louis, Mo.), G=1-hydroxyethylidene-1,1-diphosphonic acid (Solutia, Inc., St Louis, Mo.), H=polyacrylic acid (Nalco Chemical Company, Naperville, Ill.), I=diethylene triamine (Aldrich Chemical Co. Milwaukee, Wis., J=polyoxyalkylene diamine-polyamide polymer (prepared as described in Example 7), K=poly(alkylene glycol) diamine-polyamide polymer (prepared as described in Example 8). As used in Table 3 and throughout the specification, "PAMAM" stands for polyaminoamide.

TABLE 3

Silica Stabilization Test Results - 24 Hour Test

| Sample | Chemical | Soluble SiO$_2$ (ppm as SiO$_2$) |
|---|---|---|
| A | Blank | 160 |
| C | PEOX | 270 |
| D | PADETA | 400 |
| J | EO/PO-PAMAM | 260 |
| K | PE-PAMAM | 230 |
| B | Acumer 500 | 165 |
| H | Polyacrylic acid | 160 |
| E | PBTC | 160 |
| F | AMP | 167 |
| G | HEDP | 165 |
| I | DETA | 170 |

Table 3 shows results from 24 hour testing of silica-containing solutions in the presence of various additives. The results clearly show that both nonionic polymers, PEOX and PADETA, give superior performance over that of the anionic dispersant polymer, namely Acumer 5000, or polyacrylate polymer. In fact, the performance of Acumer 5000 was not statistically different than that observed for the blank solutions in which no scale control agent was added. This result is consistent with many years of observations from actual cooling water systems in which anionic dispersant polymers designed to control calcium phosphate and calcium carbonate scale and deposition do not demonstrate a benefit toward the control of silica scale. See Dubin et al, *Deposit control in high silica water*, Materials Performance. pp. 27–33 (1995); and Gill, *Silica Scale control*, CORROSION 98, Paper No. 226 (1998).

The performance of PADETA over that of PEOX is also evident, showing that the structural modification of having the interactive functional groups within the polymer backbone results in improved silica polymerization inhibition activity.

It should be understood that various changes and modifications to the presently preferred embodiments described herein will be apparent to those skilled in the art. Such changes and modifications can be made without departing from the spirit and scope of this invention and without diminishing its attendant advantages. It is therefore intended that such changes and modifications be covered by the appended claims.

We claim:

1. A method for inhibiting the formation and deposition of silica and silicate compounds in water systems comprising adding to the water in the water system an effective amount of a polyaminoamide or polyetheramide condensation polymer obtained by the polymerization of:

i) at least one carbonyl compound of formula

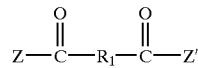

wherein

R$_1$ is selected from linear, cyclic or branched C$_1$–C$_8$ alkylene groups, aromatic groups, polycyclic groups and heterocyclic groups;

Z and Z' are independently selected from halogen, —OH, —OR$_2$, and OC(O)R$_2$; and R$_2$ is selected from linear, cyclic or branched C$_1$–C$_8$ alkyl groups, aromatic groups, polycyclic groups or heterocyclic groups, with ii) at least one polyamine of formula

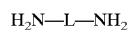

wherein L is any combination of linear, cyclic or branched C$_2$–C$_8$ alkylene groups, aromatic groups, polycyclic groups and heterocyclic groups, where at least one of the alkylene, aromatic, polycyclic and heterocyclic groups are connected through NH or O, said polymer utilizing secondary amine and/or ether and amide functionality incorporated into the backbone of said polymer to inhibit said formation and deposition of said silica and silicate scale.

2. The method of claim 1 wherein R$_1$ is selected from linear, cyclic or branched C$_4$–C$_8$ alkylene groups and aromatic groups.

3. The method of claim 1 wherein the carbonyl compounds are selected from the group consisting of: adipic acid; sebacic acid; terephthalic acid and combinations thereof.

4. The method of claim 1 wherein the polyamines are selected from the group consisting of polyamines of formula

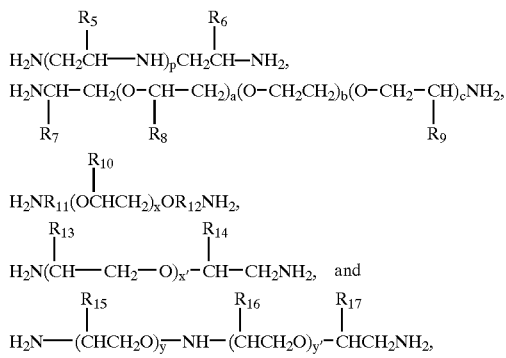

wherein

- $R_3$ and $R_4$ are independently selected from linear, cyclic or branched $C_2$–$C_8$ alkylene groups, aromatic groups, polycyclic groups and heterocyclic groups;
- $R_5$ and $R_6$ are independently selected from hydrogen and methyl;
- $R_7$, $R_8$, $R_9$, $R_{10}$, $R_{13}$ $R_{14}$, $R_{15}$, $R_{16}$ and $R_{17}$ are independently selected at each occurrence from hydrogen and $C_1$–$C_4$ alkyl;
- $R_{11}$ and $R_{12}$ are $C_1$–$C_4$ alkylene;
- x is an integer of from 1 to about 10;
- x' is an integer of from about 2 to about 5;
- y and y' are independently integers of from about 2 to about 58.
- p is an integer of from 0 to about 8;
- the sum of a+c is from about 2 to about 8;
- b is an integer of from about 2 to about 50, provided that the polyamine of formula $H_2NR_3NH_2$, is always used in a mixture that contains at least one additional polyamine other than $H_2NR_3NH_2$.

5. The method of claim 3 wherein the polyamine compound is diethylenetriamine or 4,7,10-trioxa-1,13-tridecane diamine.

6. The method of claim 3 wherein the polyamine has formula

Wherein $R_3$ and $R_4$ are independently selected from linear, cyclic or branched $C_2$–$C_8$ alkylene groups, aromatic groups, polycyclic groups and heterocyclic groups.

7. The method of claim 3 wherein the polyamine has the formula

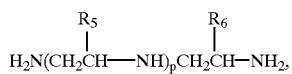

wherein $R_5$ and $R_6$ are independently selected from hydrogen and methyl; and p is an integer of from 0 to about 8.

8. The method of claim 3 wherein the polyamine has formula

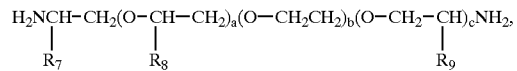

wherein

- $R_7$, $R_8$ and $R_9$ are independently selected from hydrogen and $C_1$–$C_4$ alkyl;
- the sum of a+c is from about 2 to about 8; and
- b is an integer of from about 2 to about 50.

9. The method of claim 3 wherein the polyamine has the formula

wherein

- $R_{10}$ is selected from hydrogen and $C_1$–$C_4$ alkyl;
- $R_{11}$ and $R_{12}$ are $C_1$–$C_4$ alkylene; and
- x is an integer of from 1 to about 10.

10. The method of claim 3 wherein the polyamine has the formula

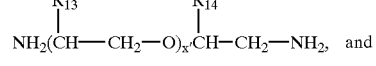

wherein

- $R_{13}$ and $R_{14}$ are independently selected from hydrogen and $C_1$–$C_4$ alkyl; and
- x' is an integer of from about 2 to about 5.

11. The method of claim 3 wherein the polyamine has formula

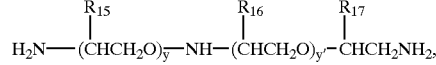

wherein

- $R_{15}$, $R_{16}$ and $R_{17}$ are independently selected at each occurrence from hydrogen and $C_1$–$C_4$ alkyl; and
- y and y' are independently integers of from about 2 to about 58.

12. The method of claim 3 wherein the polyamine is a mixture of diamines of formula

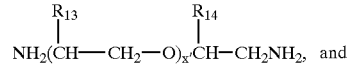

and triamines of formula

- $R_{13}$, $R_{14}$, $R_{15}$, $R_{16}$ and $R_{17}$ are independently selected at each occurrence from hydrogen and $C_1$–$C_4$ alkyl;
- x' is an integer of from about 2 to about 5; and
- y and y' are independently integers of from about 2 to about 58.

13. The method of claim 1 wherein the water system is selected from the group consisting of: cooling waters; geothermal waters; salt water for desalinization purposes; industrial waters being prepared for boiler treatment and steam generation; downhole waters for petroleum crude recovery; pulp and paper mill waters; and mining and mineral processing waters.

14. The method of claim 1 wherein the polymer is combined with an effective amount of a second water treating agent.

15. The method of claim 14 wherein the second water treating agent is selected from the group consisting of: polymer scale control dispersants; metal chelating agents; corrosion inhibitors; microbiocides; flocculants; coagulants; oxygen scavengers; neutralizing amines; and scale inhibitors.

* * * * *